(12) United States Patent
Kao

(10) Patent No.: US 7,219,807 B2
(45) Date of Patent: May 22, 2007

(54) TOOL SUSPENSION DEVICE HAVING A SEPARABLE TOOL BRACKET WITH OFFSET PARTING LINE

(76) Inventor: Jui-Chien Kao, No. 358, Tunghsing Rd., Shuwang Li, Tali City, Taichung Hsien (TW)

( * ) Notice: Subject to any disclaimer, the term of this patent is extended or adjusted under 35 U.S.C. 154(b) by 165 days.

(21) Appl. No.: 10/759,470

(22) Filed: Jan. 15, 2004

(65) Prior Publication Data
US 2005/0155945 A1 Jul. 21, 2005

(51) Int. Cl.
*A47F 7/00* (2006.01)
(52) U.S. Cl. ...................... 211/70.6; 206/376
(58) Field of Classification Search ............... 211/70.6; 206/376
See application file for complete search history.

(56) References Cited

U.S. PATENT DOCUMENTS

| | | | | | |
|---|---|---|---|---|---|
| 3,927,765 | A | * | 12/1975 | Beal | 206/481 |
| 4,634,005 | A | * | 1/1987 | Kulzer et al. | 206/477 |
| 4,813,642 | A | * | 3/1989 | Matsui | 248/221.11 |
| 5,044,591 | A | * | 9/1991 | Huang | 248/317 |
| 5,713,467 | A | * | 2/1998 | Kao | 206/349 |
| 5,785,174 | A | * | 7/1998 | Chow | 206/349 |
| 5,788,303 | A | * | 8/1998 | Chia-Hsiang | 294/143 |
| 5,803,253 | A | * | 9/1998 | Zakarian | 206/349 |
| 5,906,350 | A | * | 5/1999 | Kao | 248/688 |
| 5,996,817 | A | * | 12/1999 | Kao | 211/70.6 |
| 6,076,669 | A | * | 6/2000 | Ling | 206/349 |
| 6,164,463 | A | * | 12/2000 | Lee | 211/70.6 |
| 6,186,323 | B1 | * | 2/2001 | Jansson et al. | 206/349 |
| 6,193,200 | B1 | * | 2/2001 | Kao | 248/309.1 |
| RE37,129 | E | * | 4/2001 | Chow | 206/349 |
| 6,241,092 | B1 | * | 6/2001 | Vasudeva | 206/349 |
| 6,283,311 | B1 | * | 9/2001 | Lee | 211/70.6 |
| 6,315,119 | B1 | * | 11/2001 | Lee | 206/349 |
| 6,375,005 | B1 | * | 4/2002 | McCann | 206/349 |
| 6,378,700 | B1 | * | 4/2002 | Tong | 206/376 |
| 6,464,840 | B1 | * | 10/2002 | McCann | 206/376 |
| 6,578,711 | B1 | * | 6/2003 | Chou | 206/467 |
| 6,655,529 | B2 | * | 12/2003 | Ho | 206/373 |
| 6,679,379 | B1 | * | 1/2004 | Kao | 206/349 |
| 6,719,154 | B2 | * | 4/2004 | Kao | 211/70.6 |
| 6,732,989 | B1 | * | 5/2004 | Kao | 248/309.1 |

(Continued)

FOREIGN PATENT DOCUMENTS

DE 102004003336 * 8/2005

(Continued)

*Primary Examiner*—Jennifer E. Novosad
(74) *Attorney, Agent, or Firm*—patenttm.us; James H. Walters

(57) ABSTRACT

A mold assembly for making a tool bracket of a tool suspension device includes a lower part and an upper part. The upper part is mounted on the lower part and includes a common mold and multiple interchangeable molds. The common mold has multiple through cavities to mold the tool brackets simultaneously. Each through cavity has a primary flat molding surface. The interchangeable molds are demountably mounted in common mold and have upper cavities aligned respectively with the through cavities. Each of the upper cavities has a bottom, a marking portion formed on the bottom and a secondary flat molding surface flush with the primary flat molding surface of the aligned through cavity. Consequently, the tool bracket molded by the mold assembly has a front product indicator and an offset parting line to make the front of the tool bracket clean.

1 Claim, 10 Drawing Sheets

U.S. PATENT DOCUMENTS

| | | | | |
|---|---|---|---|---|
| 6,742,653 B2 * | 6/2004 | Kao | | 206/373 |
| D494,066 S * | 8/2004 | Liu | | D9/457 |
| 6,820,742 B1 * | 11/2004 | Chen | | 206/378 |
| 6,827,210 B2 * | 12/2004 | Chen | | 206/349 |
| 6,837,373 B2 * | 1/2005 | Huang | | 206/376 |
| 6,840,389 B2 * | 1/2005 | Chen | | 211/70.6 |
| 6,874,630 B2 * | 4/2005 | Lin Wu | | 206/349 |
| 6,883,664 B2 * | 4/2005 | Lee | | 206/349 |
| 6,886,796 B1 * | 5/2005 | Elander | | 248/339 |
| D506,129 S * | 6/2005 | Plumer | | D9/415 |
| 6,935,516 B2 * | 8/2005 | Chiang | | 211/70.6 |
| 2002/0175257 A1 * | 11/2002 | Yen | | 248/309.1 |
| 2003/0015444 A1 * | 1/2003 | Molin et al. | | 206/366 |
| 2003/0062277 A1 * | 4/2003 | Chen | | 206/349 |
| 2003/0102275 A1 * | 6/2003 | Kao | | 211/70.6 |
| 2003/0141266 A1 * | 7/2003 | Lin | | 211/70.6 |
| 2004/0020810 A1 * | 2/2004 | Kao | | 206/376 |
| 2004/0020880 A1 * | 2/2004 | Kao | | 211/70.6 |
| 2004/0089620 A1 * | 5/2004 | Chen | | 211/70.6 |
| 2004/0094444 A1 * | 5/2004 | Chen | | 206/376 |
| 2004/0099553 A1 * | 5/2004 | Chen | | 206/349 |
| 2004/0099621 A1 * | 5/2004 | Chen | | 211/70.6 |
| 2004/0124106 A1 * | 7/2004 | Chen | | 206/376 |
| 2005/0061757 A1 * | 3/2005 | Chiang | | 211/70.6 |
| 2005/0098462 A1 * | 5/2005 | Hernandez et al. | | 206/376 |

FOREIGN PATENT DOCUMENTS

GB 2410236 * 7/2005

* cited by examiner

TOOL SUSPENSION DEVICE HAVING A SEPARABLE TOOL BRACKET WITH OFFSET PARTING LINE

BACKGROUND OF THE INVENTION

1. Field of the Invention

The present invention relates to a tool suspension device, and more particularly to a tool suspension device has a separatable tool bracket with offset parting lines, and a plastic injection mold assembly for making the tool bracket.

2. Description of Related Art

With reference to FIG. 9, a conventional tool suspension device in accordance with prior art comprises a suspension board (50), a tool bracket (51) and fasteners (52). The suspension board (50) has a front (not numbered) and a bottom (not numbered). The tool bracket (51) is mounted detachably on the front of the suspension board (50) at the bottom and comprises a U-shaped body (not numbered) and two mounting feet (not numbered). The body has a longitudinal tool slot (511), a front (not numbered) and two opposite sides (not numbered). The mounting feet are formed respectively on and protrude respectively from the sides of the body. The fasteners (52) are attached respectively to the mounting feet to fasten the tool bracket (51) on the front of the suspension board (50). Therefore, a tool, such as a wrench (70) can be inserted into and held in the tool slot (511) for suspension.

Both the suspension board (50) and tool bracket (51) are made by plastic injection molding. The suspension board (50) and tool bracket (51) need separate mold sets. For custom specialty products, the front of the body of the tool bracket (51) is molded with a product indicator (512), such as trademarks, significant symbols, characters, etc. to provide relevant product information about the tool suspension device.

With reference to FIGS. 9 and 10, a plastic injection mold assembly (not numbered) in accordance with the prior art to make the tool bracket (51) with the front product indicator (512) is mounted on a mold base (60) and comprises a lower part (61) and an upper part (62). The lower part (61) is mounted on the mold base (60) and has a top (not numbered) and multiple cores (611) formed on the top. The cores (611) are arranged along two straight lines.

The upper part (62) is mounted detachably on the top of the lower part (61) and comprises a common mold (620) and two interchangeable molds (622). The common mold (620) has a top (not numbered), a bottom (not numbered), two channels (not numbered) and multiple cavities (621). The cavities (621) are defined in the bottom of the common mold (620) and correspond respectively to the cores (611). Each pair of corresponding cavity (621) and core (611) fabricates a tool bracket (51). The channels are defined in the top of the common mold (620) and are aligned respectively with the in-line cavities (621). Each of the cavities (621) has a bottom (not numbered), a molding surface (not numbered) and an opening (not numbered). The molding surface is used to shape the body of the tool bracket (51). The opening is defined through the bottom so that the cavities (621) communicate respectively with the channels.

The interchangeable molds (622) are mounted respectively in the channels and have multiple bottom protrusions (not numbered). The bottom protrusions are respectively fitted and held in the openings of the cavities (621) and have respectively a parting surface (not numbered) flush with the bottom of the adjacent cavity (621). To make the product indicator (512) such as a string of Arabic numerals on the front of the body of the tool bracket (51) (e.g. 2004 shown in FIG. 9), each parting surface has a marking portion (624) to mold the product indicator (512) on the front of the body of the tool bracket (51). The marking portion (624) may be indentations to form a solid product indicator (512) or protrusions to form an indented product indicator (512).

Therefore, when the contents of the product indicator (512) needs to be changed, only the interchangeable mold (622) has to be replaced with a new one, which will save cost of the mold assembly.

However, the described mold assembly causes a parting line (53) around the product indicator (512) on the front of the body of the tool bracket (51). The parting line (53) is formed during the injection molding along the interface of the opening in the bottom of each cavity (621). Improper location of the parting line (53) on the front of the body of the tool bracket (51) will effect the appearance of the tool bracket (51) and cause the front of the tool bracket (51) to be untidy. Therefore, the whole tool suspension device becomes unsightly.

In addition, defining the opening in the bottom of each of the cavities (621) forms an annular protrusion (623) that protrudes into the molding surface of the cavity (621). The annular protrusions (623) will restrict machining means for defining the cavities (621) in the common mold (620). Electric discharge machining (EDM) is the only way to define the cavities (621) except wire-cut electric discharge machining. Wire-cut machining cannot be used because of the annular protrusions (623). Electric discharge machining requires more time and cost to define the cavities (621) than wire cutting machining does.

To overcome the shortcomings, the present invention provides an improved plastic injection mold assembly to make a separatable tool bracket with offset parting lines to mitigate or obviate the aforementioned problems.

SUMMARY OF THE INVENTION

The main objective of the invention is to provide a tool suspension device that has a separatable tool bracket with offset parting lines to make a front of the tool bracket clean and neat.

Another objective of the present invention is to provide a plastic injection mold assembly for making a tool bracket with offset parting lines where the injection mold assembly comprises a common mold and multiple interchangeable molds to reduce mold costs.

A mold assembly for making a tool bracket for a tool suspension device includes a lower part and an upper part. The lower part has multiple cores. The upper part is mounted detachably on the lower part and includes a common mold and multiple interchangeable molds. The common mold has multiple cavities corresponding respectively to the cores to simultaneously mold multiple tool brackets. Each of the cavities has a primary flat molding surface. The interchangeably molds are mounted detachably in the common mold and have multiple upper cavities aligned and communicating respectively with the cavities in the common mold. Each of the upper cavities has a bottom, a marking portion formed on the bottom and a secondary flat molding surface flush with the primary flat molding surface of the aligned cavity. Consequently, a tool bracket molded by the mold assembly has a front product indicator and an offset parting line to make a front of the tool bracket clean.

Other objectives, advantages and novel features of the invention will become more apparent from the following detailed description when taken in conjunction with the accompanying drawings.

DETAILED DESCRIPTION OF PREFERRED EMBODIMENT

Figure 1:
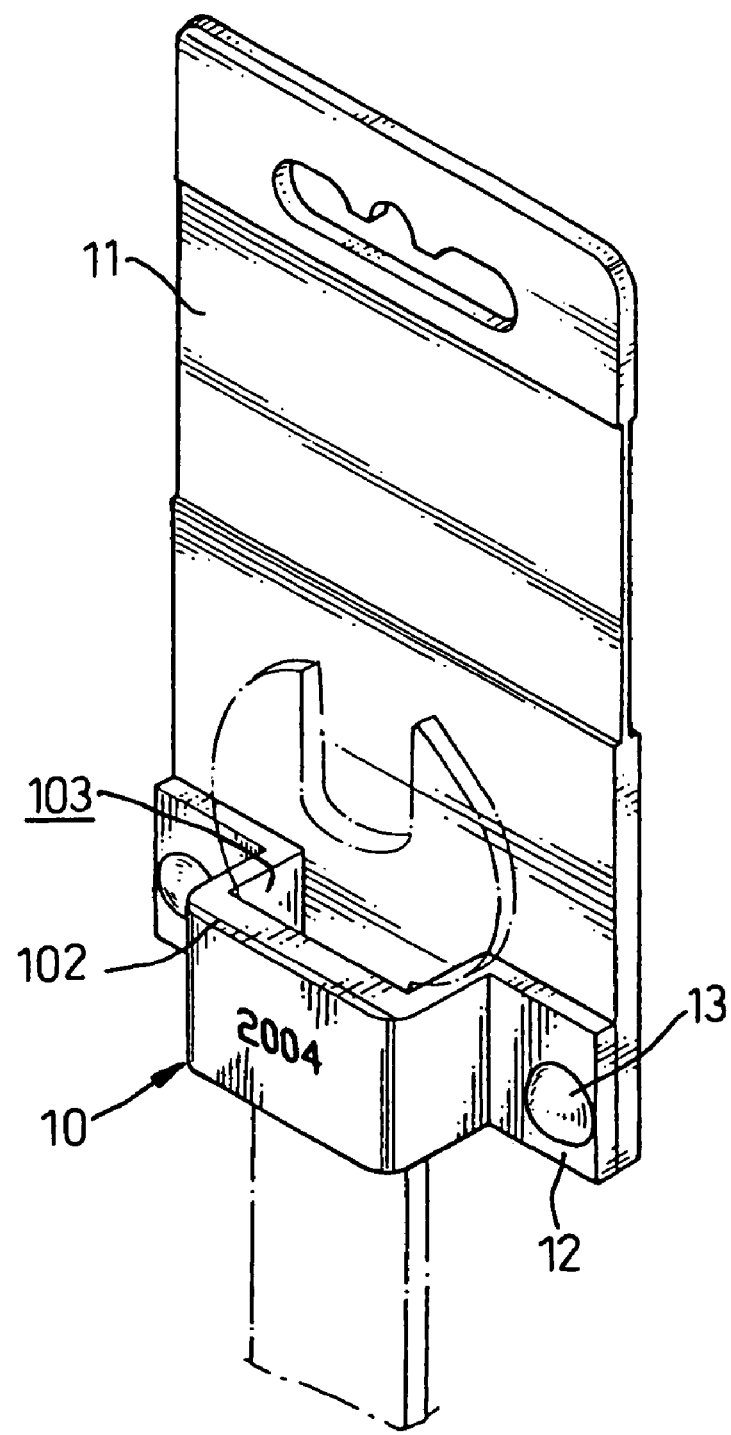
FIG. 1 is an operational perspective view of a tool suspension device in accordance with the present invention.
Figure 2:
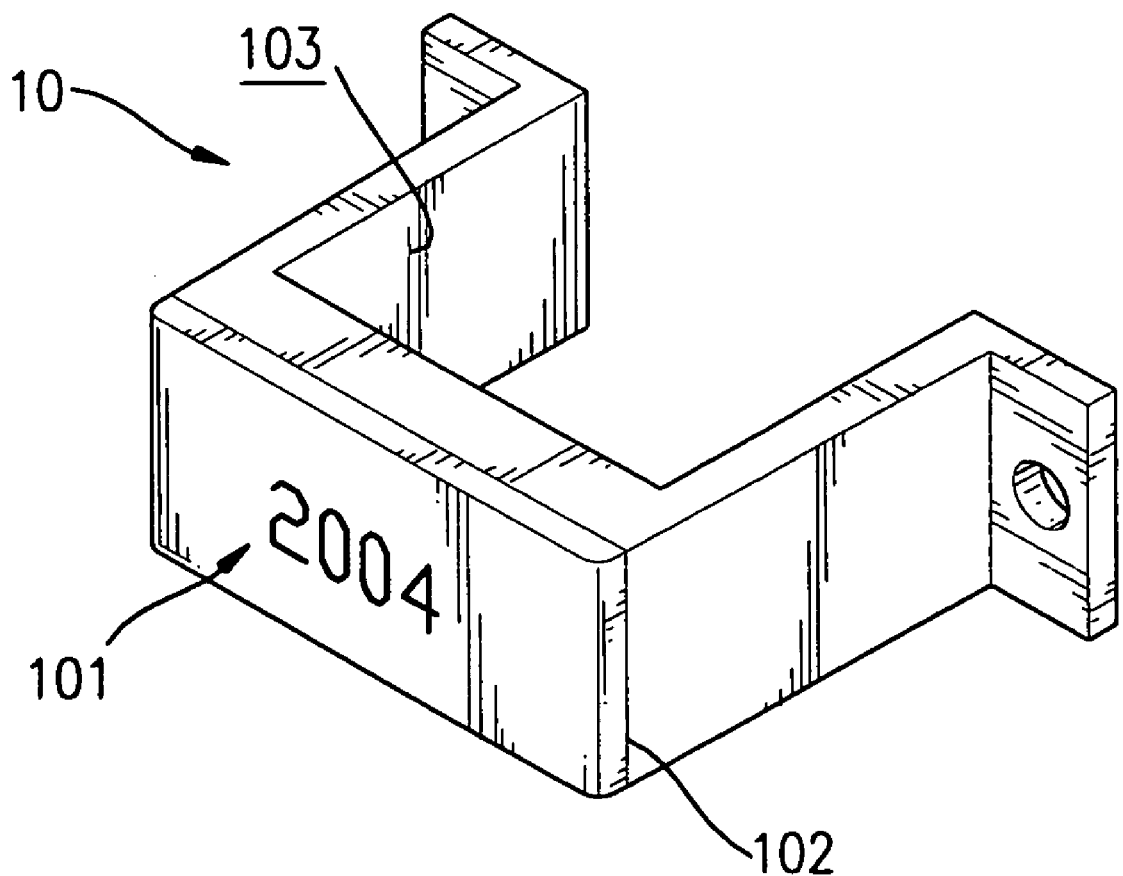
FIG. 2 is a perspective view of a tool bracket of the tool suspension device in FIG. 1.

With reference to FIGS. 1 and 2, a tool suspension device in accordance with the present invention comprises a suspension board (11), a tool bracket (10) and multiple fasteners (13). The suspension board (11) has a front (not numbered). The tool bracket (10) is attached demountably to the front of the suspension board (11) with the fasteners (13) and comprises a U-shaped body (not numbered) and two mounting feet (12). The body has a longitudinal tool slot (103), a front (not numbered), a top (not numbered), a bottom (not shown) and two opposite sides (not numbered). The tool slot (103) is defined from the top to the bottom to hold a tool, such as a wrench (not numbered). The mounting feet (12) extend respectively from the sides of the body to mount the tool bracket (10) on the front of the suspension board (11) with the fasteners (13).

Figure 6:
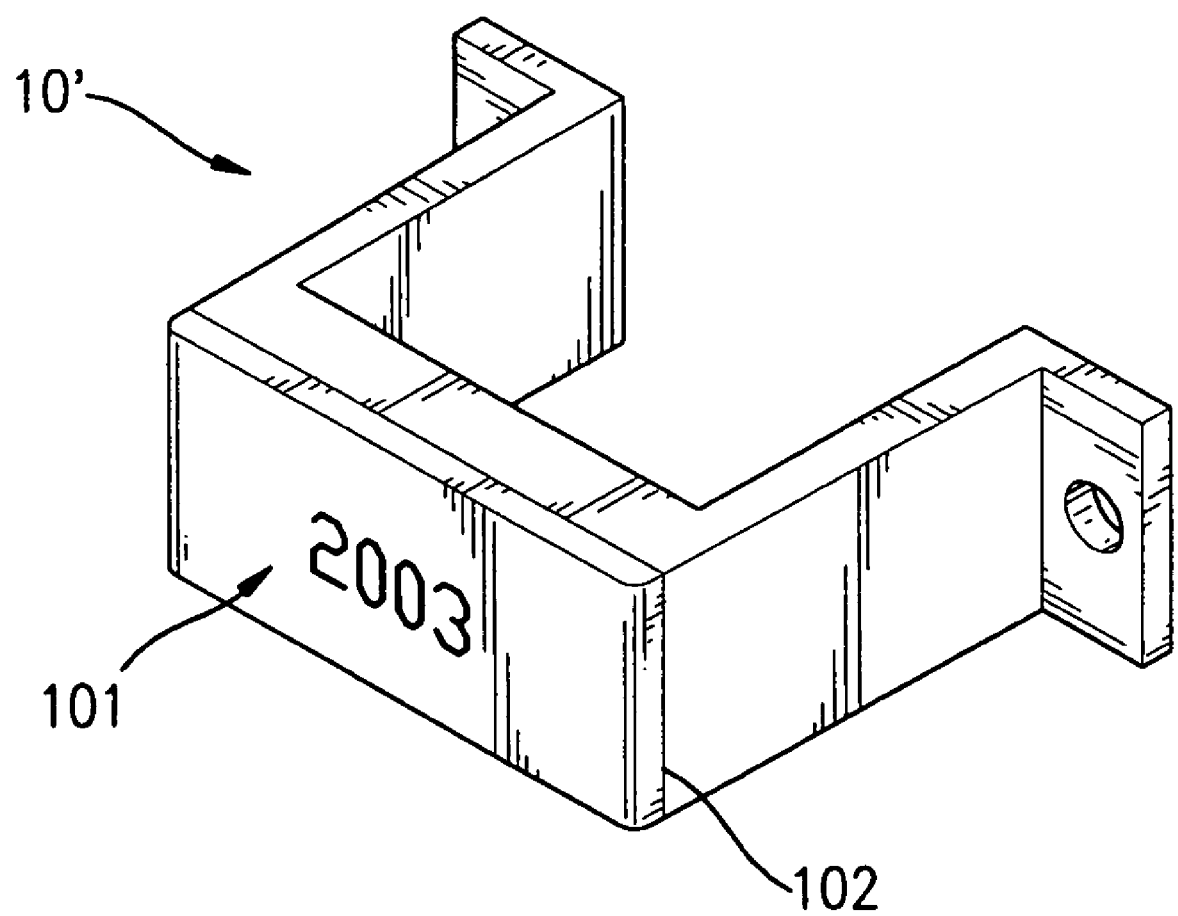
FIG. 6 is a perspective view of an alternative embodiment of the tool bracket in accordance with the present invention.

With reference to FIGS. 2 and 6, the tool bracket (10) has a product indicator (101) formed on the front of the body to provide some relevant product information about the tool suspension device. The product indicator (101) may be a trademark, company logo, useful characteristic, significant symbol, etc. and is molded on the front of the body of the tool bracket (10). For illustrative purposes only, the product indicator (101) on the tool bracket (10) in FIGS. 1 and 2 is 2004, and the product indicator (101) on the tool bracket (10') in FIG. 6 is 2003. The tool brackets (10, 10') have respectively individual product indicators (101) to make them distinct from each other. Therefore, the tool suspension device may use different types of tool bracket (10, 10') for customer specialty products.

Figure 3:
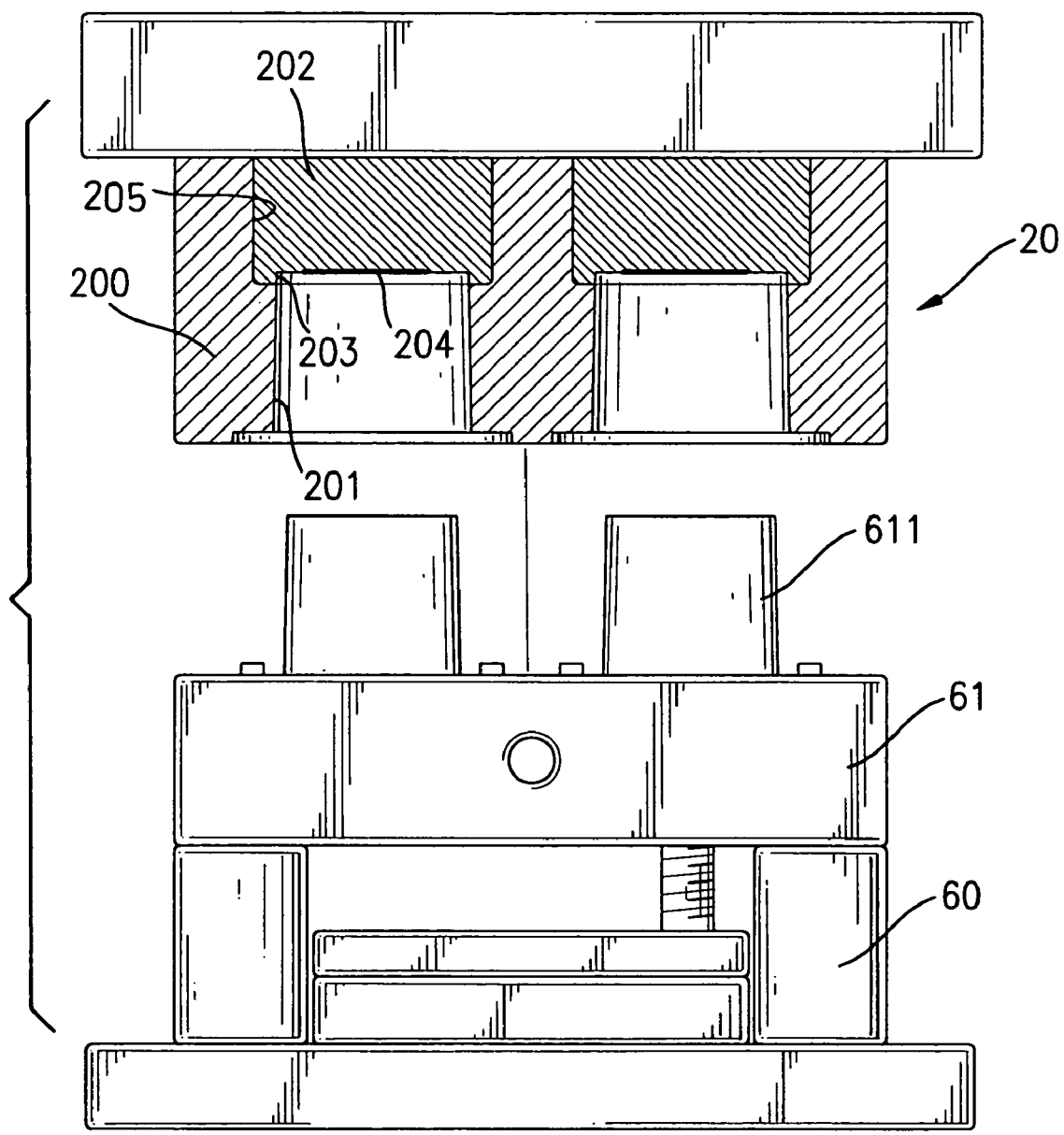
FIG. 3 is a side plan view in partial section of a mold assembly to make tool brackets in FIG. 2.
Figure 4:
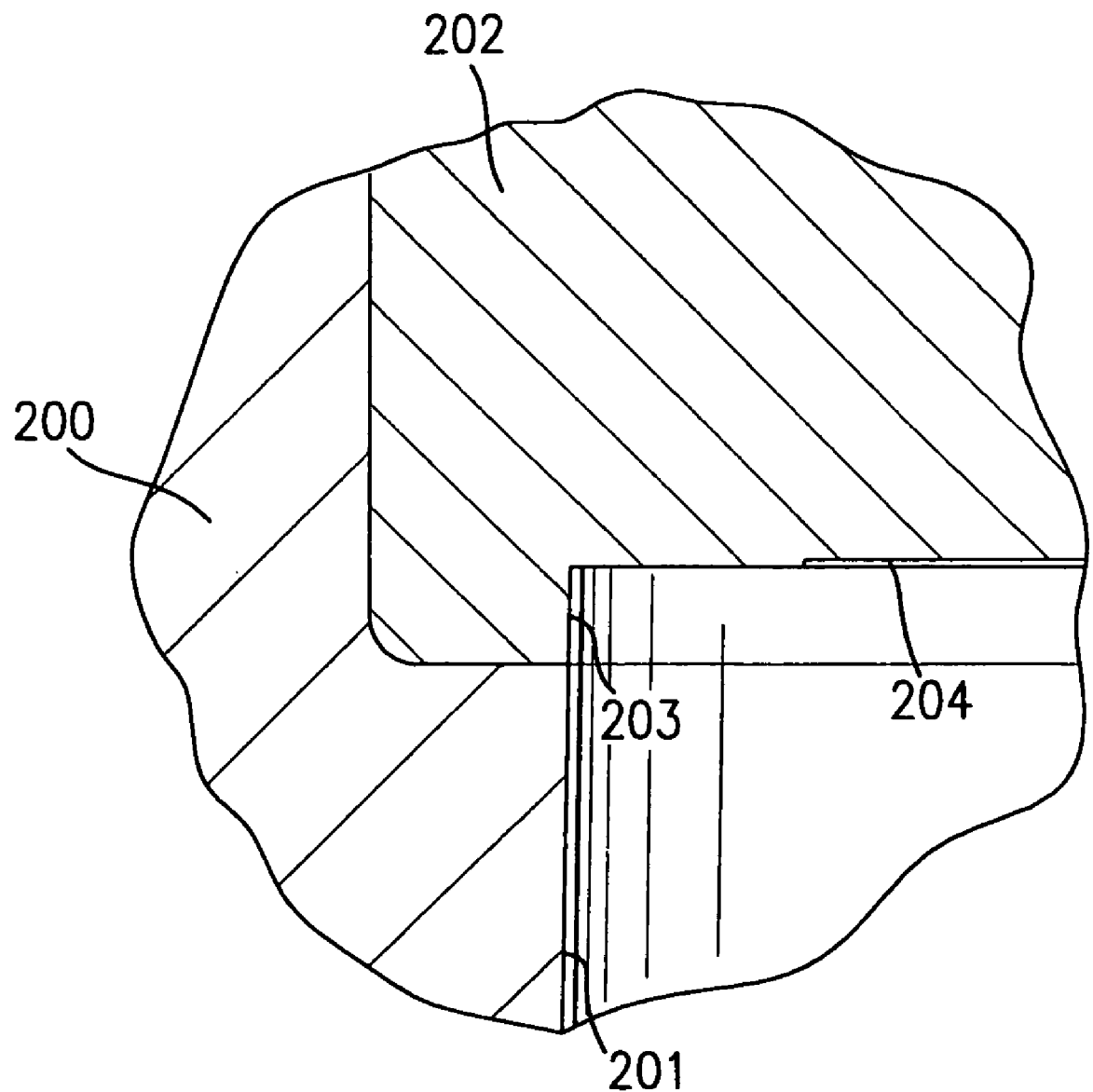
FIG. 4 is an enlarged cross sectional side plan view of a segment of an upper part of the mold assembly in FIG. 3.
Figure 5:
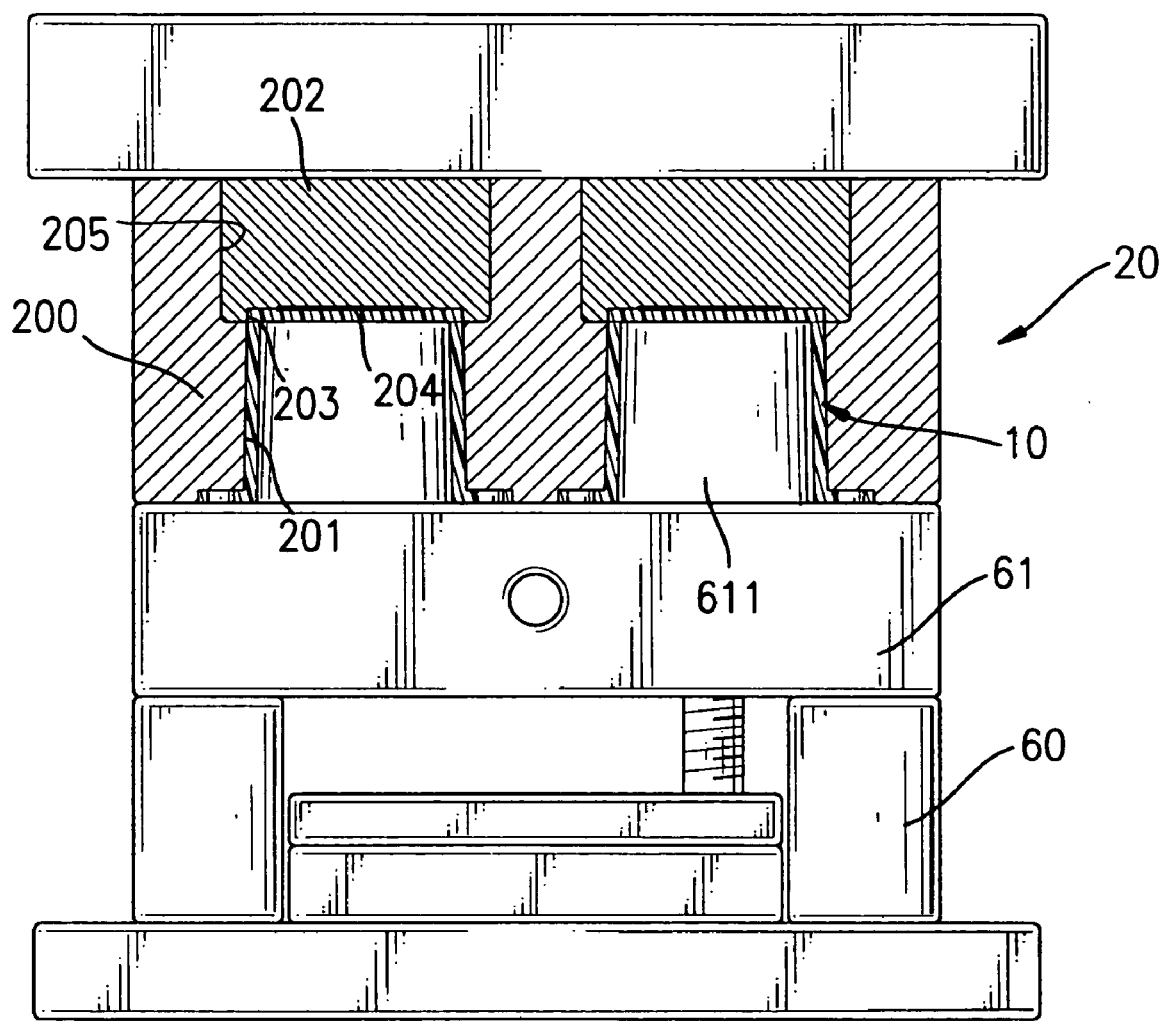
FIG. 5 is an operational side plan view in partial section of the mold assembly in FIG. 3 molding multiple tool brackets in FIG. 2.

With further reference to FIGS. 3, 4 and 5, a plastic injection mold assembly (not numbered) for making the tool bracket (10) is mounted on a mold base (60) and comprises a lower part (61) and an upper part (20). The lower part (61) is mounted on the mold base (60) and has a top (not numbered) and multiple cores (611) formed on the top. The cores (611) are arranged in two straight lines. Each of the cores (611) is used to fabricate one tool bracket (10) so that the mold assembly forms simultaneously multiple tool brackets (51) at a time to improve efficiency. The quantity of the core (611) may be one, which means the mold assembly only forms one tool bracket (51) at a time.

The upper part (20) is mounted demountably on the top of the lower part (60) and comprises a common mold (200) and multiple interchangeable molds (202). The common mold (200) has a top (not numbered), a bottom (not numbered), multiple through cavities (201) and two channels (205). Each of the through cavities (201) is defined in the bottom of the common mold (200) and has a primary flat molding surface (not numbered). The through cavities (201) are arranged in two straight lines and correspond respectively to the in-line cores (611). An amount of the through cavities (201) corresponds to the amount of the cores (611). The channels (205) are defined in the top of the common mold (200) and are respectively aligned and communicated with the in-line through cavities (201).

The interchangeable molds (202) are mounted respectively in the channels (205) in the common mold (200), and each interchangeable mold (202) has a bottom (not numbered) and multiple upper cavities (203). The upper cavities (203) are defined in the bottom of the interchangeable molds (202) and are respectively aligned with the corresponding through cavities (201). Each of the upper cavities (203) communicates with the aligned through cavity (201) in the common mold (200) and has a secondary flat molding surface (not numbered), a bottom (not numbered) and a marking portion (204). The secondary flat molding surface is flush with the primary flat molding surface of the through cavity (201) to avoid protrusions relative to the primary flat molding surface of the through cavity (201). The primary and the secondary flat molding surfaces are used to shape the body of the tool bracket (10) during the injection molding. The design of the primary flat molding surface of the through cavity (201) permits using wire-cutting machining to define the through cavities (201). Using wire-cutting machining is more effective and faster than electronic discharge machining to define the through cavities (201).

With reference to FIGS. 2 and 5, the marking portion (204) is formed on the bottom of the upper cavity (203) to mold the product indicator (101) on the front of the body of the tool bracket (10). Since the secondary flat molding surface of the upper cavity (203) is flush with the primary flat molding surface of the through cavity (201), a continuous parting line (102) is formed along the interface between the interchangeable mold (202) and the common mold (200) on the top, the bottom and the sides of the body of the tool bracket (10) and is free and separated from the front of the body. Consequently, the parting line (102) is not visible when a consumer faces the front of the tool suspension device. Therefore, the front of the body of the tool bracket (10) is clean and neat.

With reference to FIGS. 1, 3 and 6, making the tool brackets (10, 10') with different product indicators (101) only requires that the interchangeable molds (202) be replaced. Always using the common mold (200) of the upper part (20) of the mold assembly reduces the overall upper part (20) cost. The depth of the upper cavity (203) in the interchangeable mold (202) is not deep so only a short time is required for the electronic discharge machining to define the upper cavity (203).

Figure 7:
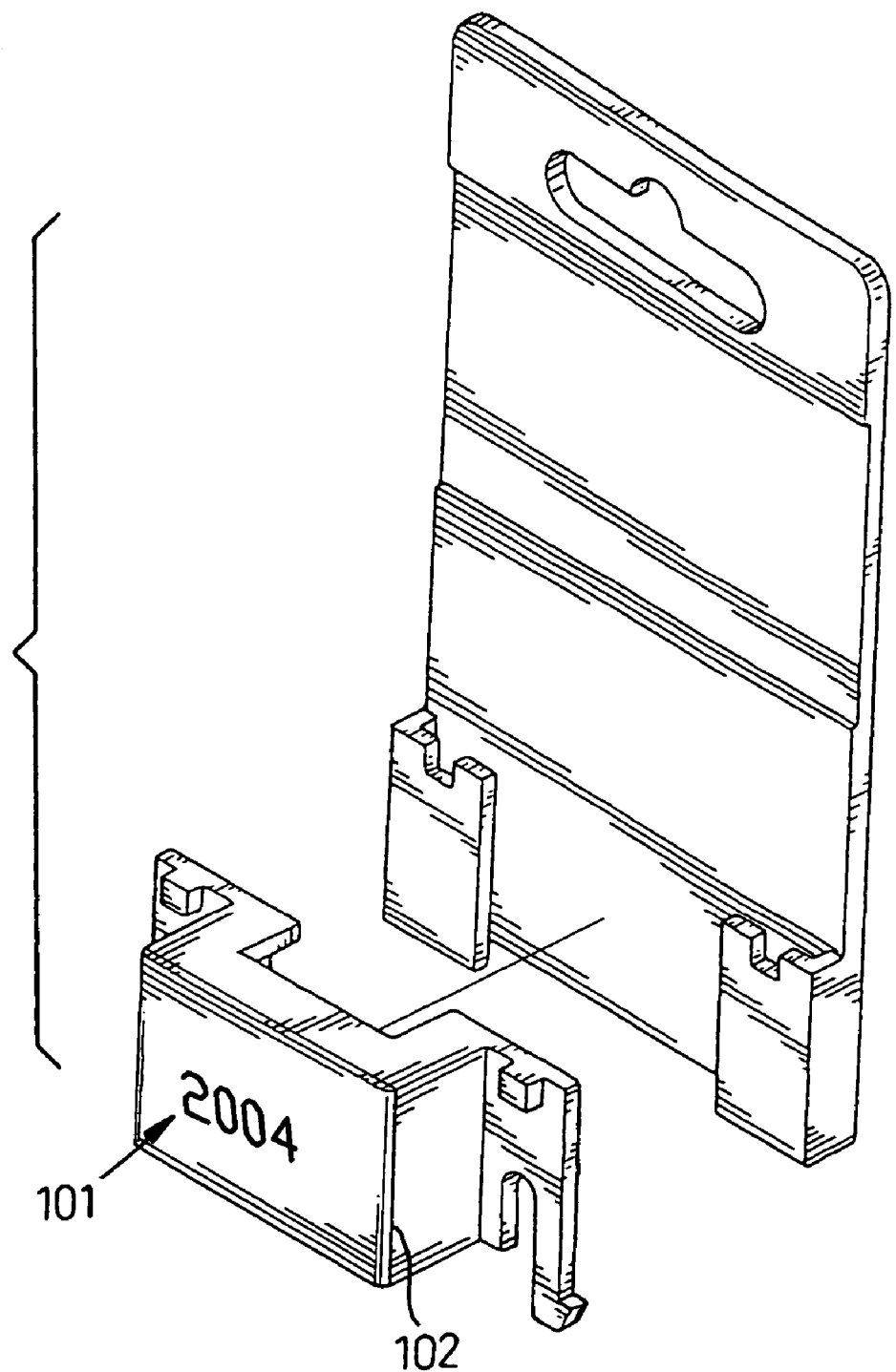
FIG. 7 is an exploded perspective view of a second embodiment of the tool suspension device in accordance with the present invention.
Figure 8:
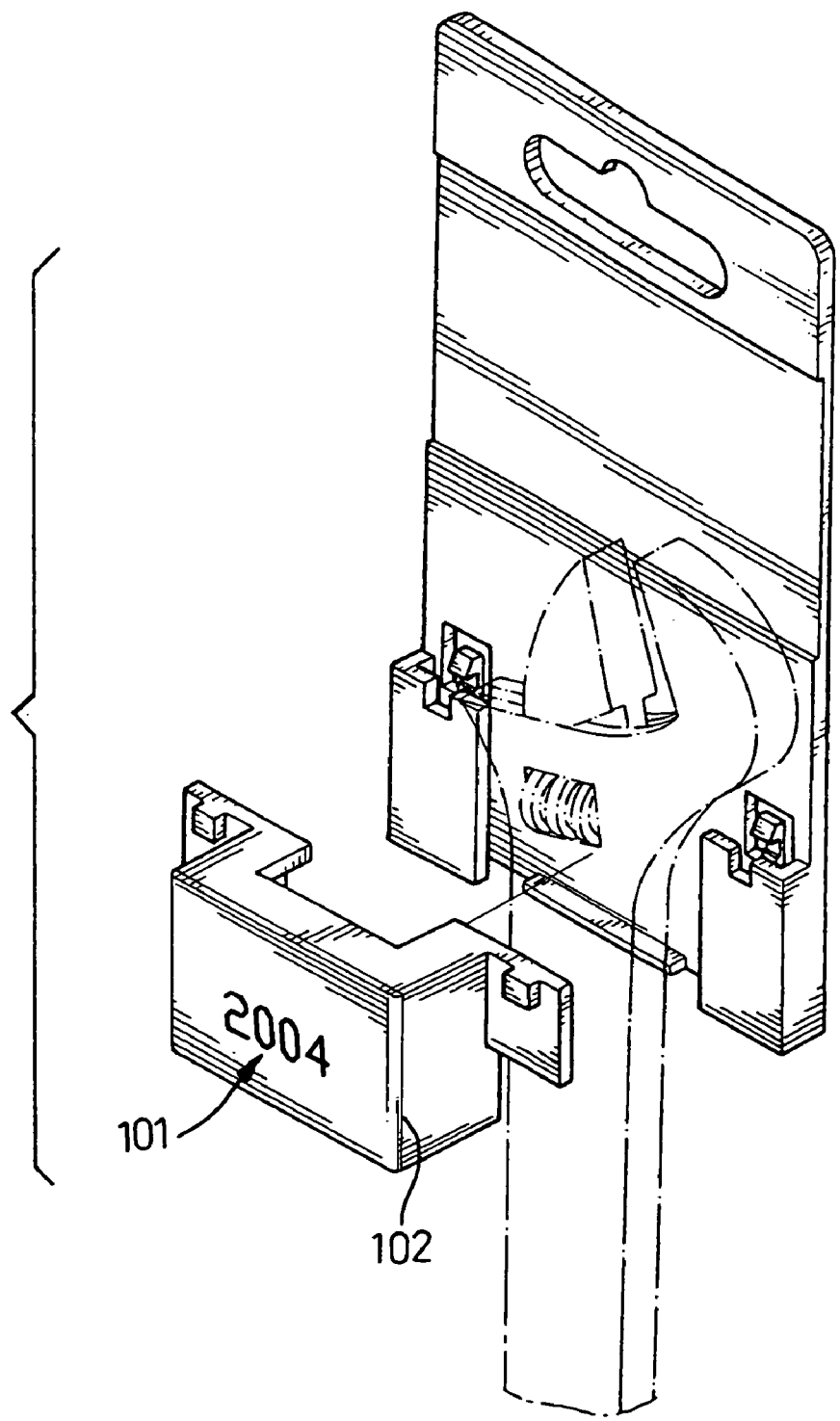
FIG. 8 is an exploded perspective view of a third embodiment of the tool suspension device in accordance with the present invention.
Figure 9:
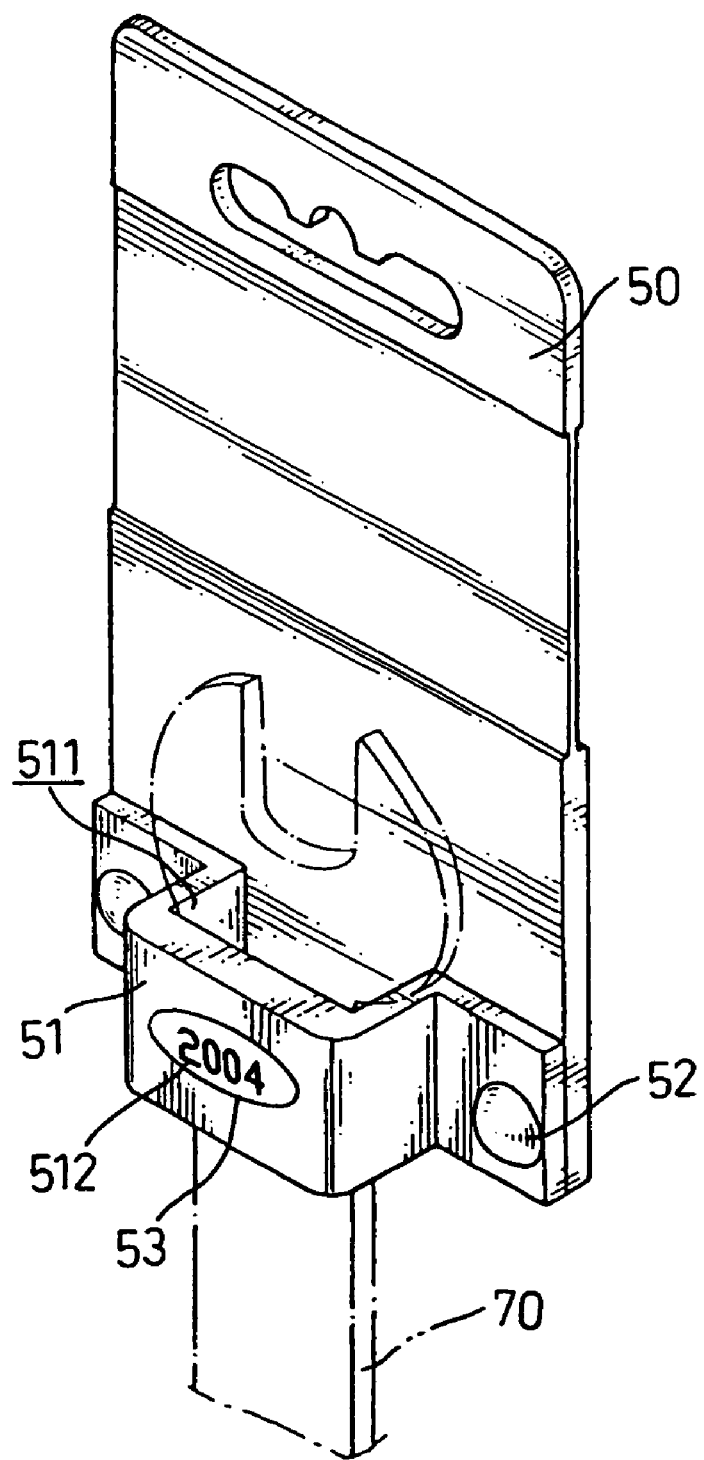
FIG. 9 is a perspective view of a conventional tool suspension device in accordance with the prior art.
Figure 10:
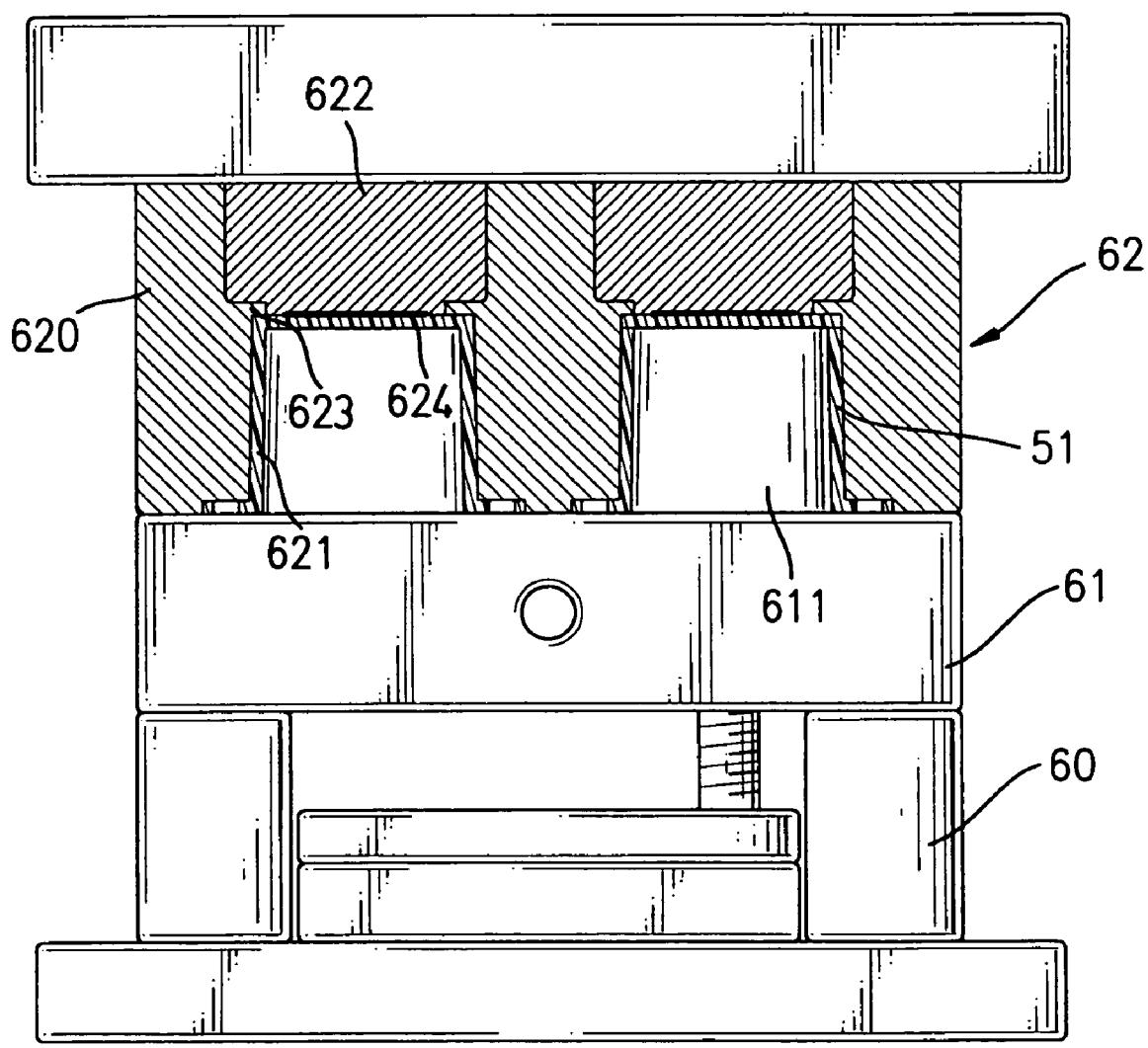
FIG. 10 is an operational side plan view in partial section of a conventional mold assembly in accordance with the prior art for making the tool bracket in FIG. 9.

With reference to FIGS. 7 and 8, the tool suspension device in accordance with the present invention may comprise different types of tool brackets that are fastened respectively by different attaching means.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A tool suspension device comprising:
   a suspension board having a front; and
   a tool bracket mounted demountably on the front of the suspension board and having
   a U-shaped body having a top, a bottom, two opposite sides each having an interior and exterior surface, a front having an interior surface which extends between the top and bottom and in between the interior surfaces of the sides and an exterior surface which extends between the top and bottom and between the exterior surfaces of the sides, and a longitudinal tool slot defined between the top and the bottom, between the interior surfaces of the sides and between the interior surface of the front and the front of the board;
   wherein when the bracket is viewed from the top, a first parting line is visible which extends substantially adjacent the front of the bracket at a location lying between the interior and exterior surfaces of the front, and the first parting line extending from the exterior surface of one of the sides to the exterior surface of the other of the sides and being generally parallel to the board;
   wherein when the bracket is viewed from the bottom, a second parting line is visible which extends substantially adjacent the front of the bracket at a location between the interior and exterior surfaces of the front and the second parting line extending from the exterior surface of one of the sides to the exterior surface of the other of the sides;
   wherein when the bracket is viewed from a first one of the sides, a third parting line is visible which extends substantially adjacent the front of the bracket and between the top and bottom;
   wherein when the bracket is viewed from a second one of the sides, a fourth parting line is visible which extends substantially adjacent the front of the bracket and between the top and bottom;
   wherein the first, second, third, and fourth parting lines form a continuous parting line around the top, bottom and sides which is entirely not visible when the bracket is viewed from the exterior surface of the front and the exterior surface of the front being entirely free from the parting lines; and
   a product indicator molded on the exterior surface of the front of the U-shaped body.

* * * * *